United States Patent [19]

Nakajima et al.

[11] Patent Number: 4,522,650

[45] Date of Patent: Jun. 11, 1985

[54] PROCESS FOR PRODUCTION OF LOW PHOSPHORUS ALLOY

[75] Inventors: Hidemasa Nakajima; Shozo Okamura; Masanobu Sueyasu; Sakae Furujho; Kohji Okane, all of Tokyo; Shoji Anezaki, Ibaragi, all of Japan

[73] Assignee: Sumitomo Metal Industries, Ltd., Osaka, Japan

[21] Appl. No.: 537,025

[22] Filed: Sep. 29, 1983

[30] Foreign Application Priority Data

Sep. 29, 1982 [JP] Japan ................................. 57-172319

[51] Int. Cl.$^3$ ............................................... C21C 7/00
[52] U.S. Cl. ........................................... 75/48; 75/129; 75/130 R; 75/59.1; 75/59.12; 75/59.29; 75/59.3; 75/59.31
[58] Field of Search ................... 75/51, 52, 59, 60, 48, 75/129, 130 R, 130.5

[56] References Cited

U.S. PATENT DOCUMENTS

| | | | |
|---|---|---|---|
| 4,045,213 | 8/1977 | Leroy | 75/59 |
| 4,329,171 | 5/1982 | Robert | 75/59 |
| 4,365,992 | 12/1982 | Sieckman | 75/60 |
| 4,411,697 | 10/1983 | Spenceley | 75/60 |

Primary Examiner—Peter D. Rosenberg

Attorney, Agent, or Firm—Burns, Doane, Swecker & Mathis

[57] ABSTRACT

Herein is disclosed a process for producing an alloy of low phosphorus content by means of a furnace equipped with a lance for injection. The process is characterized by producing an alloy of low phosphorus content and at the same time by gasifying the carbonaceous material.

The process comprises the steps of:

forming a bath of molten metal by pouring a molten metal in the furnace, said molten metal containing not more than 0.040% of phosphorus;

injecting by means of said lance into said bath of molten metal a carbonaceous material together with a gasifying agent to gasify the carbonaceous material with the heat of the bath of molten metal and to increase the carbon content of the bath of molten metal, said carbonaceous material containing not more than 0.035% of phosphorus;

adding to said bath of molten metal an alloying element to react with the molten metal thereby forming an alloy; and recovering the formed gas and, at the same time, obtaining the alloy of low phosphorus content.

The process is suitable for producing Cr steel, Mn steel and Ni steel.

33 Claims, 4 Drawing Figures

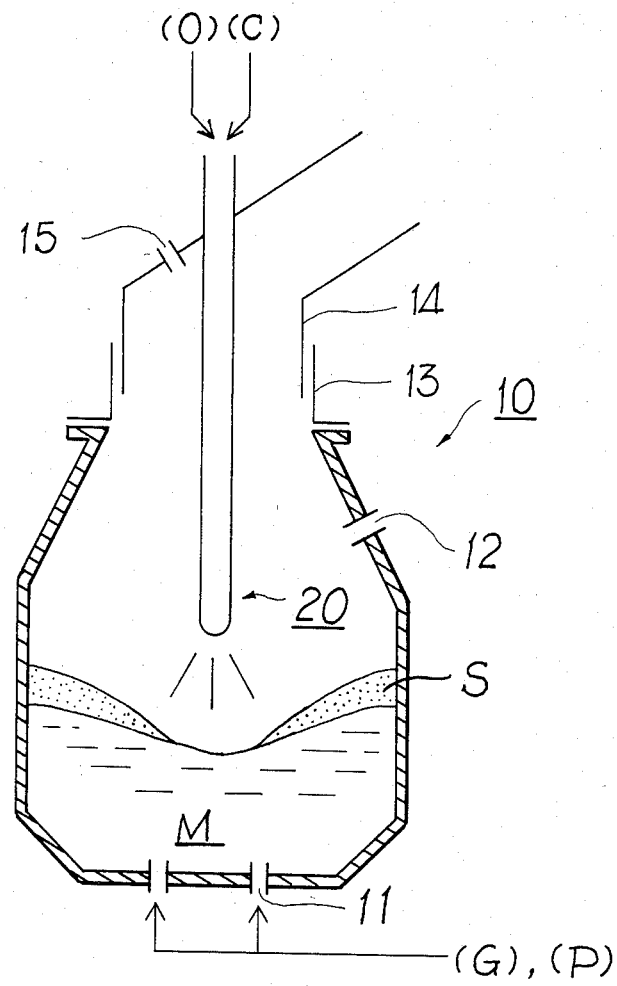

PROCESS FOR PRODUCTION OF LOW PHOSPHORUS ALLOY

BACKGROUND OF THE INVENTION

The present invention relates to a process for producing an alloy of low phosphorus content which is to be refined, preferably by an oxygen blowing converter.

The present invention also relates to a process for producing alloy steel such as Mn steel, Cr steel and Ni steel etc, and more particularly, the present invention relates to a process for the production of an alloy by means of a gasifying furnace. The gasifying furnace was developed for gasifying the carbonaceous material such as coal and coke and is equipped with a lance for injecting a carbonaceous material together with a gasifying agent into the bath of molten metal.

DESCRIPTION OF THE PRIOR ART

Generally, alloy steel such as Mn steel, Cr steel and Ni steel are produced by means of an electric furnace or an oxygen blowing converter. In these processes, metallic ore is melted and reduced in a bath of molten iron to result in a crude steel alloy, which is then refined into alloy steel. However, the refining process by an electric furnace consumes much electric power in melting and reducing the metallic ore and thus it becomes more and more expensive because of the increase in the cost of electric power in a country such as Japan. Therefore, the refining process by an oxygen blowing converter becomes more preferable and economical, and is now widely employed.

In the refining process by an oxygen blowing converter, however, there are some problems.

First, the melting of the ore or metallic scrap causes a considerable drop in temperature of the molten metal to be treated. Moreover, the reduction of the ore is an endothermic reaction. It is very difficult to compensate for the drop in temperature of the bath by the oxygen blowing and therefore it is obliged to employ a high amount of pig iron.

Second, Cr, Mn and Ni are elements which are easily oxidized and trapped in the slag under a condition of high oxidizing potential. On the other hand, in order to dephosphorize the metal, the refining should be conducted under a condition of high oxidizing potential. If the oxidizing potential is raised, these expensive alloying elements are oxidized and trapped in the slag resulting in a decrease of the yield thereof.

In this connection, it may be supposed to employ a dephosphorized pig iron as a base metal in order to minimize the amount of the refining slag. But, the dephosphorizing step invites also a considerable drop in temperature of the molten iron to be refined and the reduction of manganese or chromium ore is also an endothermic reaction. Thus, the use of dephosphorized molten iron in the refining process of Mn steel or Cr steel necessitates the use of a large amount of molten pig iron which must be previously heated to high temperatures. In other words, ore or scrap can not be used in a large amount, which renders the process too expensive. Furthermore, and the temperature control in the refining process becomes very difficult.

In the case of the refining of Cr steel by an electric furnace, chromium ore is pretreated, e.g., briquetted, sintered or pelletized in order to stabilize the melting operation and to decrease the consumption of electric power. As explained hereinbefore, the refining by an electric furnace is not itself economical and the pretreatment of the ore makes it more expensive. In this prior art process, the formed gas is recovered to some extent, but it does not compensate for the cost of the electric consumption and of the pretreatment of the ore.

Further, in the case of the refining of Ni steel, nickel ore should be pretreated to remove a high amount of water and hydrated water contained therein. Moreover, in case of the refining of high Ni steel, addition of a large amount of nickel ore or scrap stainless steel lowers the temperature of the molten metal to be treated. Thus, the refining thereof by means of oxygen blowing converter is difficult to operate with a good heat balance.

SUMMARY OF THE INVENTION

With the background thus far described, the present invention has been conceived to solve the aforementioned problems of the prior art.

It is therefore, an object of the present invention to provide a novel technique for efficiently and economically producing an alloy of low phosphorus content.

Another but major object of the present invention is to provide a novel process for producing alloy steel which is stable and efficient in melting and reducing the metal ore and enables the production of alloy steel with an improved heat balance and yield of the alloying element.

According to the present invention, there is provided a process for producing an alloy of low phosphorus content by means of a furnace equipped with a lance for injection. The process comprises the steps of:

forming a bath of molten metal by pouring a molten metal in the furnace, said molten metal containing not more than 0.040% of phosphorus;

injecting by means of said lance into said bath of molten metal a carbonaceous material together with a gasifying agent to gasify the carbonaceous material with the heat of the bath of molten metal and to increase the carbon content of the bath of molten metal, said carbonaceous material containing not more than 0.035% of phosphorus;

adding to said bath of molten metal an alloying element to react with the molten metal thereby forming an alloy; and recovering the formed gas and, at the same time, obtaining the alloy of low phosphorus content.

The resulting alloy of low phosphorus content is to be then refined by means of an oxygen blowing converter, an electric furnace or other appropriate means.

According to an embodiment of the present invention, the molten metal to be treated by the process is a pig iron or steel.

The carbonaceous material may be coal, coke, pich or heavy oil to be gasified into $H_2$, $CO$. The carbonaceous material is preferably injected with a carrier gas such as Ar, $N_2$, $CO_2$, and $O_2$.

According to another feature of the present invention, the gasifying agent includes oxygen, which may be mixed with water vapour.

According to a preferable embodiment of the present invention, the furnace is equipped with a tuyere or nozzle at the bottom thereof, and a gas such as Ar, $N_2$, $O_2$ or $CO_2$ is injected into the bath of molten metal to stir the same.

The alloying element may be added in the form of ore, for example pellet or agglomerated form. Preferably, ore is injected in the form of powder with a carrier gas through the lance or through the nozzle provided at the bottom of the furnace.

The alloying element may be added in the form of metallic scrap containing the same.

According to the present invention, the alloying element may be Mn, Cr and/or Ni.

BRIEF DESCRIPTION OF THE DRAWINGS

Other objects, features and advantages of the present invention will become more apparent from the following description made in conjunction with the accompanying drawings, in which;

FIG. 1 is a longitudinal section showing schematically a furnace which is preferably employed to conduct the process according to the present invention.

FIG. 2b is a bottom view showing in the direction 3—3 the lance of FIG. 2a.

FIG. 2c is transverse section taken along line 4—4 of FIG. 2a.

DESCRIPTION OF THE PREFERRED EMBODIMENTS

Figure 2A:
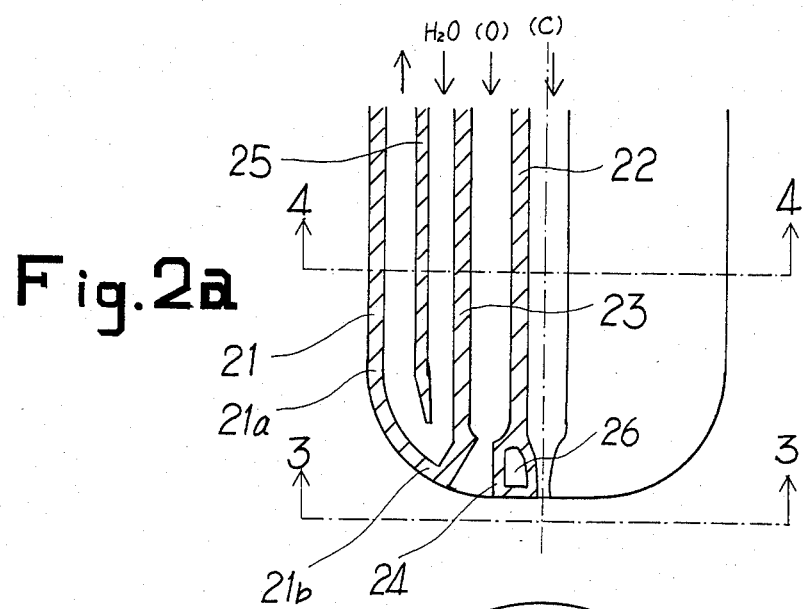
FIG. 2a is an enlarged longitudinal view showing partially in section a lance of a furnace which is preferably employed for conducting the process according to the present invention.

After research and development for long years, we have invented a process for producing an alloy of low phosphorus content, which is economical and suited for commercial large-scale production.

The present invention is based on our finding that the gasifying furnace with a molten metal provides good conditions for melting and reducing metallic ores and metal oxides. That is, we noted that the gasifying operation of the carbonaceous material with the bath of molten iron generates a high amount of thermal energy and gives a reducing condition in the bath.

The gasifying furnace was developed for gasifying the low grade carbonaceous material in the epoque of petroleum crisis. This gasifying operation is conducted by injecting a carbonaceous material together with the gasifying agent in the molten metal. As it is well known in the art, the gasifying reaction of the carbonaceous material is an exothermic reaction and therefore it tends to raise the temperature of the molten metal bath. Further, the carbonaceous material is reduced in the molten bath and thus the carbon content of the bath is increased to offer a reducing condition. Thus, if the gasifying furnace with the bath of molten iron is employed for melting and reducing the metallic ores and the metal oxides, the aforementioned problems of the prior-art would be solved.

Further, according to the present invention, it is possible to solve the problem of dephosphorization by using starting materials of low phosphorus content.

In the process according to the present invention, the phosphorus content of the molten metal which forms the bath is restricted to not more than 0.040%, and that of the carbonaceous material to be injected is also restricted to not more than 0.035%.

If the phosphorus content of the molten metal is more than 0.040%, the resulting alloy would contain naturally more than 0.040% of phosphorus.

On the other hand, the refining slag used in the melting in the gasifying furnace is ordinally of a basicity of 1.2 to 2.0 and then the dephosphorization rate in the refining by means of the gasifying furnace would be about 20% in total. If a carbonaceous material of a phosphorus content of more than 0.035% is employed, the molten metal forming the bath would contain more than 0.040% of phosphorus after the gasifying and reducing operation with such slag. The iron base alloy containing more than 0.040% of phosphorus is hardly dephosphorized in the next refining step of the metal.

In the case of producing chromium containing iron which is to be subsequently refined to Cr steel in the refining step, the bath of molten metal in the gasifying furnace is heated to a temperature sufficiently high for the reduction of chromium ore. And such high temperature of the bath enables the use of a powder of chromium ore without special pretreatment. The chromium ore to be used in the process should be simply ground and dried, although it is of course possible to employ aggolmerated ore, dry pellet and semireduced pellet. Accordingly, the temperature of the molten iron bath may be controlled easily and the scrap and metallic ore can be used at a high ratio. Further, recovering the formed gas lowers the total cost of production.

In the case of the production of Mn steel, Fe-Mn alloy of low phosphorus content can be prepared by means of a gasifying furnace and it may be subsequently refined to Mn steel by means of an ordinary oxygen blowing converter. Such process of the combination of the melting and reducing by a gasifying furnace and the refining by an ordinary oxygen blowing converter enables the use of low cost manganese ore without increasing the use of molten pig iron.

Further, in the case of the production of Ni steel, the resulting Fe-Ni alloy by the melting by the gasifying furnace may be desulfurized and oxidation-refined by means of the same gasifying furnace or other means such as a refining ladle. In this case also, nickel ore may be used as simply ground and dried.

The process according to the present invention will be now explained by referring to the accompanying drawings.

Referring to FIG. 1, there appears a gasifying converter as indicated generally at reference numeral 10, which is constructed of a refractory wall. The space defined by this wall is charged with molten iron M.

Indicated generally at reference numeral 20 is a lance which is adapted to be moved vertically in an upright position toward and away from the top surface of the molten iron M.

The lance 20 is supplied separately with carbonaceous material (C) such as coal, coke, pich and heavy oil, and oxygen (O), and injects the same in the form of a jet at its nose.

The furnace is provided at the bottom thereof with nozzles 11 for injecting into the bath M a powdered metallic ore and/or metal oxide (P), and a stirring gas (G) such as Ar, $N_2$, $O_2$, $CO_2$.

As shown in the figure, the furnace 10 is further provided with a hole 12 for teeming out the molten metal, a skirt 13 and hood 14 which seats in the skirt 13 and forms a path for recovering the gasified carbonaceous material. The hood 14 is provided with a hole 15 for adding to the bath submaterial such as slag-forming flux.

Figure 2B:
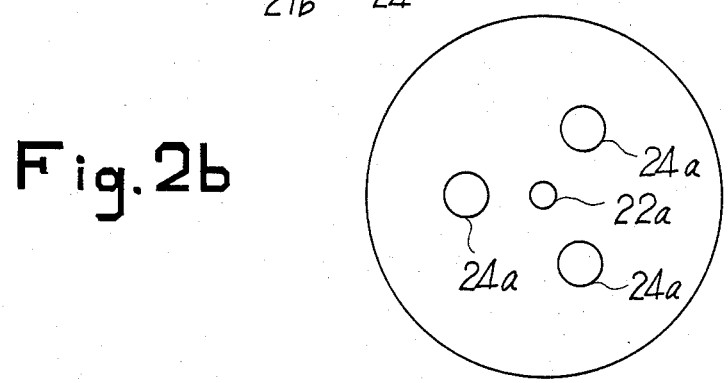
Figure 2C:
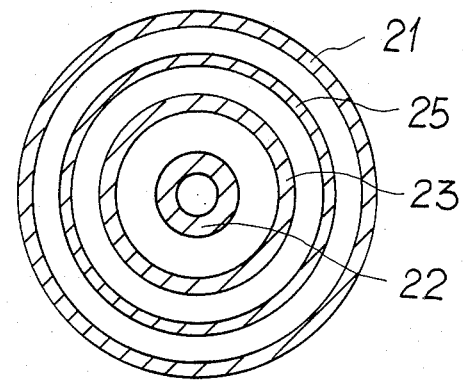

Turning now to FIG. 2a to FIG. 2c, the lance 20 will be described in more detail.

The right-hand portion of FIG. 2a is abreviated to simplify the illustration.

The lance 20 has a four-walled structure which is generally constructed of a sheath 21, a carbonaceous material supply tube 22, oxygen supply tube 23 leading to three Laval nozzles 24, and a partition 25.

Radially inner wall portions of the oxygen supply tubes 23 and the Laval nozzles 24 may be made integral with the radially outer wall portions of the carbonaceous material supply tube 22. Reverting to FIG. 2a, the sheath 21 is formed with a generally cylindrical side wall 21a and a blinded bottom wall 21b. The carbonaceous supply tube 22 also has a generally cylindrical shape and is disposed at the center of the lance 20. The tube 22 is constructed to have its exit 22a opened in the bottom wall of the sheath 21.

The lance 20 includes a bottom water jacket forming a relatively complex water passage 26, which is not described here in detail because it does not directly relate to the gist of the present invention. The supply tube 22 defines a supply passage for carrying a powdered carbonaceous material therethrough.

As better seen from FIG. 2b, the Laval nozzles 24 may be spaced by an equal angle of 120 degrees from one another. The number of those nozzles 24 may be arbitrary depending upon the design requirements. In either event, the oxygen supply tube 23 thus arranged define three oxygen supply passages for supplying the oxygen gas.

On the other hand, the Laval nozzles 24 are constructed to respectively lead downward from the oxygen supply tube 23 and to have their exits 24a opened in the bottom wall of the sheath 21 for blowing the oxygen.

The alloying element in the form of powdered metallic ore or metal oxide may be added to the bath not only through the nozzle 11 but also by throwing them into the bath through the hole 15 or by injecting the same through the lance.

The metal ore or metal oxide may be injected in the form of powder with a carrier gas such as Ar, $N_2$, $CO_2$ and $O_2$.

In order to produce an alloy steel by means of the furnace as shown in FIG. 1, a previously desiliconized and dephosphorized molten iron is poured in the furnace 10 to form a bath M of a temperature of about 1,200° to 1,400° C. Then, a carbonaceous material (C) is injected into the bath together with oxygen (O) from the lance 20. The carbonaceous material is gasified and the resulting gas ($H_2$, $CO_2$ etc,) is recovered through the skirt 13 and the hood 14.

A flux is added to the bath M to form a slag S on the surface of the bath.

When the temperature of the bath is raised to about 1,500 to 1,600 C. by the exothermic reaction of the gasification of the material (C), the metal ore or metal oxide is added to the bath M by injection through the bottom nozzles 11 or lance 20 or other means. The added metal ore or metal oxide is abruptly heated and melted down in the bath, and thus reduced to metal by reacting with the carbon which is abundant in the bath of metal.

During the proceeding of the melting and reducing of the metal ore and oxide, the metal oxide may not be completely reduced and then trapped by the slag S. But the metal oxide trapped by the slag may be reduced and recovered into the molten bath by increasing the amount of the gas injected from the bottom of the furnace to positively stir the bath while stopping the injection of the metal oxide or ore, or by injecting again the carbonaceous material through the lance 20 to control the carbon content of the bath M.

The resulting iron base alloy may be refined to alloy steel such as Cr steel, Mn steel and Ni steel. Such refining may be conducted by means of a gasifying furnace, an ordinary oxygen blowing converter, an electric furnace or other appropriate means.

Now, the present invention will be explained by way of examples, which by no means restrict the scope of the present invention.

EXAMPLES

Molten pig iron was desiliconized and dephosphorized to have a chemical composition tabulated in Table 1 and poured at a temperature of 1250° C. into a furnace of 10 ton capacity having a construction as shown in FIG. 1.

Coal powder of low phosphorus content having a chemical composition as tabulated in Table 2, and oxygen were injected through the lance to the bath of molten pig iron respectively at a rate of 2500 kg/hr and of 2240 $Nm^3$/hr.

When the temperature of the bath reached 1500° C. by the reaction of the coal powder and oxygen, the injection rate of said coal powder and oxygen were regulated respectively to 2500 kg/hr and 1890 $Nm^3$/hr. Concurrently with the regulation of the injection, pulverized chromium ore was mixed with the coal powder and injected through the nozzle 22a into the bath. The rate of injection of chromium ore was adjusted depending upon the change in temperature of the bath, but the mean rate thereof was about 1500 kg/hr.

A flux was added to the bath to form a slag having an appropriate basicity between 1.2 and 2.0.

The injection of oxygen, coal powder and chromium ore were continued for about 4.7 hours, and then it was stopped and concurrently the rate of the injection of Ar through the nozzle at the bottom of the furnace was increased from 40 $Nm^3$/hr to 100 $Nm^3$/hr in order to intensively stir the bath and maintained thereat for five minutes.

TABLE 1

| Chemical Composition of the Pig Iron (wt %) | | | | | |
|---|---|---|---|---|---|
| C | Si | Mn | P | S | Cr |
| 4.21 | Tr | 0.31 | 0.006 | 0.003 | Tr |

TABLE 2

| Chemical composition of the Coal Powder | | | | | | | | |
|---|---|---|---|---|---|---|---|---|
| I.M | Ash | V.M | C | H | O | N | S | P (%) |
| 9.1 | 2.0 | 5.4 | 94.5 | 1.2 | 3.75 | 0.5 | 0.23 | 0.002 |

The resulting Cr-Fe alloy was then teemed out from the furnace and poured into an oxygen blowing converter equipped with a nozzle for stirring gas at the bottom thereof.

The refining of the Cr-Fe alloy by said oxygen blowing converter was conducted by a mode as illustrated in Table 3. In this refining, 100 kg of quick lime was added to the bath in the decarbonization period, and 800 kg of quick lime and 50 kg of fluorspar were added as a slag forming agent in the reduction period of the refining operation.

TABLE 3

| | Gas Blowing Modes (Nm³/Hr) | | | | |
|---|---|---|---|---|---|
| | Decarbonization Period | | | | Reducing |
| | I | II | III | IV | Period |
| Top Blowing (O₂) | 2200 | 1150 | 200 | — | — |
| Bottom Blowing (Ar) | 360 | 360 | 400 | 400 | 300 |

The chemical composition of the formed gas recovered in the first melting and reducing operation of the present example is tabulated in Table 4.

The change in the chemical composition of the metal being processed and in the temperature thereof at each period of the first and second operation are also tabulated in Table 5.

TABLE 4

| Chemical Composition of the Formed Gas (%) | | |
|---|---|---|
| CO | CO₂ | H₂ |
| 85.5 | 3.7 | 6.7 |

TABLE 5

Change in Chemical Composition and in Temperature

| | C | Si | Mn | P | S | Cr | Temperature (°C.) |
|---|---|---|---|---|---|---|---|
| A | 4.21 | Tr | 0.31 | 0.006 | 0.003 | Tr | 1215 |
| B | 3.81 | Tr | 0.24 | 0.005 | 0.008 | Tr | 1530 |
| C | 3.81 | Tr | 0.10 | 0.008 | 0.099 | 15.8 | 1545 |
| D | 3.64 | Tr | 0.11 | 0.009 | 0.096 | 16.1 | 1490 |
| E | 3.62 | Tr | 0.11 | 0.009 | 0.095 | 16.1 | 1350 |
| F | 0.45 | Tr | 0.08 | 0.009 | 0.071 | 15.4 | 1700 |
| G | 0.16 | Tr | 0.07 | 0.008 | 0.069 | 14.3 | 1750 |
| H | 0.08 | Tr | 0.06 | 0.008 | 0.066 | 14.2 | 1750 |
| I | 0.02 | Tr | 0.05 | 0.008 | 0.067 | 14.1 | 1745 |
| J | 0.03 | 0.43 | 0.12 | 0.010 | 0.004 | 16.6 | 1680 |
| K | 0.04 | 0.55 | 0.78 | 0.011 | 0.004 | 16.5 | 1590 |

A: Pig iron
B: Before addition of chromium ore
C: Just after gasification
D: After rinsing by Ar
E: At the begining of the refining operation
F: After 1st decarbonization period
G: After 2nd decarbonization period
H: After 3rd decarbonization period
I: After 4th decarbonization period
J: After reducing period
K: After adjustment of alloying elements in the ladle For comparison, ordinary molten pig iron which had not been dephosphorized was treated, by the gasifying furnace employed in the example of the present invention, to prepare a Cr-Fe alloy of which chemical composition is tabulated in Table 2. The resulting Cr-Fe alloy was then refined to chromium steel (Example for comparison I).

Another example for comparison (Example for Comparison II) was made by employing a desiliconized and dephosphorized molten pig iron and a coal powder containing 0.140% of phosphorus.

The chemical composition of the metal and the temperature thereof at each step of the first and second operation are tabulated in Table 6.

TABLE 6

Change in Chemical Composition and Temperature

| | | C | Si | Mn | P | S | Cr | Temperature (°C.) |
|---|---|---|---|---|---|---|---|---|
| I | a | 4.37 | 0.22 | 0.30 | 0.148 | 0.016 | Tr | 1230 |
| | b | 3.82 | Tr | 0.13 | 0.100 | 0.088 | 16.1 | 1500 |
| | c | 0.05 | 0.60 | 0.75 | 0.121 | 0.003 | 16.4 | 1575 |
| II | a | 4.31 | Tr | 0.35 | 0.005 | 0.002 | Tr | 1220 |
| | b | 3.71 | Tr | 0.09 | 0.109 | 0.102 | 16.0 | 1480 |
| | c | 0.06 | 0.57 | 0.81 | 0.125 | 0.005 | 16.3 | 1580 |

I: Example for comparison I.
II: Example for comparison II.
a: Pig iron
b: After gasification and Ar rinsing
c: After adjustment of alloying elements in the ladle It is readily understood that when a carbonaceous material or molten pig iron of high phosphorus content is melted and reduced by means of the gasifying furnace, the resulting alloy contains a high amount of phosphorus to such an extent to need a supplementary dephosphorizing operation. But, in the case of production of a iron alloy containing an element such as Cr, Ni, Mn which are easily oxidized, such resulting alloy can not be effectively employed in the second refining operation to refine the same into alloy steel.

To the contrary, the alloy prepared according to the present invention needs not the supplemental dephosphorizing operation, and therefore it is possible to produce economically high-class alloy steels.

What is claimed:

1. Process for producing an alloy of low phosphorus content by means of a furnace equipped with a lance for injection, said process comprising the steps of:
   forming a bath of molten metal by pouring a molten metal in the furnace, said molten metal containing not more than 0.040% of phosphorus;
   injecting by means of said lance into said bath of molten metal a carbonaceous material together with a gasifying agent to gasify the carbonaceous material with the heat of the bath of molten metal and to control the carbon content of the bath of molten metal, said carbonaceous material containing not more than 0.035% of phosphorus;
   adding to said bath of molten metal an oxidizable alloying element which is in the form of at least one of the group consisting of metal, metal oxide and metal ore to react with the molten metal thereby forming an alloy; and
   recovering the formed gas and, at the same time, obtaining the alloy of low phosphorus content.

2. Process as claimed in claim 1, wherein said molten metal is a pig iron.

3. Process as claimed in claim 1, wherein said molten metal is a steel.

4. Process as claimed in claim 1, wherein said carbonaceous material is at least one element selected from a group consisting of coal, coke, pitch and heavy oil.

5. Process as claimed in claim 1, wherein said carbonaceous material is injected with a carrier gas.

6. Process as claimed in claim 5, wherein said carrier gas is at least one element selected from a group consisting of Ar, N₂, CO₂, O₂.

7. Process as claimed in claim 1, wherein said gasifying agent includes oxygen.

8. Process as claimed in claim 7, wherein said gasifying agent further includes H₂O.

9. Process as claimed in claim 1, wherein said furnace is equipped with a nozzle, and a stirring gas is injected into the bath of molten metal.

10. Process as claimed in claim 9, wherein said stirring gas is at least one element selected from a group consisting of Ar, N₂, O₂ and CO₂.

11. Process as claimed in claim 1, wherein said alloying element is added in the form of a metal ore.

12. Process as claimed in claim 11, wherein said a metal ore is pretreated into pellets.

13. Process as claimed in claim 11, wherein said a metal ore is in agglomerated form.

14. Process as claimed in claim 11, wherein pulverized a metal ore is injected with a carrier gas through said lance.

15. Process as claimed in claim 11, wherein said furnace is equipped with a nozzle at the bottom thereof and a pulverized a metal ore is injected with a carrier gas through said nozzle.

16. Process as claimed in claim 1, wherein said alloying element is added in the form of metallic scrap.

17. Process as claimed in claim 1, wherein said alloying element is at least one element selected from a group consisting of Mn, Cr and Ni.

18. Process for producing a high grade alloy steel, said process including a first operation for preparing an iron base alloy of low phosphorus content and a second operation for refining the iron base alloy into the high grade alloy steel, said first operation being conducted by means of a furnace equipped with a lance for injection and comprising the steps of:
  forming a bath of molten pig iron by pouring a molten pig iron in the furnace, said molten pig iron containing not more than 0.040% of phosphorus;
  injecting by means of said lance into said bath of molten pig iron a carbonaceous material together with a gasifying agent to gasify the carbonaceous material with the heat of the bath of molten pig iron and to control the carbon content of the bath of molten pig iron, said carbonaceous material containing not more than 0.035% of phosphorus;
  adding to said bath of molten pig iron an oxidizable alloying element which is in the form of at least one of the group consisting of metal, metal oxide and metal ore to react with the molten pig iron thereby forming an iron base alloy; and
  recovering the formed gas and, at the same time, obtaining the alloy of low phosphorus content to be treated by said second operation.

19. Process as claimed in claim 18, wherein said second operation is conducted by means of an oxygen blowing converter.

20. Process as claimed in claim 18, wherein said second operation includes the steps of:
  desulfurizing said iron base alloy; and
  refining the desulfurized iron base alloy with oxygen into alloy steel.

21. Process as claimed in claim 18, wherein said second operation is conducted by means of an electric furnace.

22. Process as claimed in claim 18, wherein said carbonaceous material is at least one element selected from a group consisting of coal, coke, pitch and heavy oil.

23. Process as claimed in claim 18, wherein said carbonaceous material is injected with a carrier gas.

24. Process as claimed in claim 23, wherein said carrier gas is at least one element selected from a group consiting of Ar, $N_2$, $CO_2$, $O_2$.

25. Process as claimed in claim 18, wherein said gasifying agent includes oxygen.

26. Process as claimed in claim 25, wherein said gasifying agent further includes $H_2O$.

27. Process as claimed in claim 18, wherein said furnace is equipped with a nozzle at the bottom thereof, and a stirring gas is injected into the bath of moten pig iron.

28. Process as claimed in claim 27, wherein said stirring gas is at least one element selected from a group consiting of Ar, $N_2$, $O_2$ and $CO_2$.

29. Process as claimed in claim 18, wherein said alloying element is added in the form of a metal ore.

30. Process as claimed in claim 29, wherein pulverized metal ore is injected with a carrier gas through said lance.

31. Process as claimed in claim 29, wherein said furnace is equipped with a nozzle at the bottom thereof and a pulverized metal ore is injected with a carrier gas through said nozzle.

32. Process as claimed in claim 18, wherein said alloying element is added in the form of metallic scrap.

33. Process as claimed in claim 18, wherein said alloying element is at least one element selected from a group consisting of Mn, Cr and Ni.

* * * * *